US012695892B2

(12) United States Patent
Wang

(10) Patent No.: US 12,695,892 B2
(45) Date of Patent: Jul. 28, 2026

(54) METHOD FOR UPDATING CODE TABLE, DEVICE, STORAGE MEDIUM

(71) Applicant: BIGO TECHNOLOGY PTE. LTD., Mapletree Business City (SG)

(72) Inventor: Shuai Wang, Beijing (CN)

(73) Assignee: BIGO TECHNOLOGY PTE. LTD., Mapletree Business City (SG)

( * ) Notice: Subject to any disclaimer, the term of this patent is extended or adjusted under 35 U.S.C. 154(b) by 2 days.

(21) Appl. No.: 18/993,292

(22) PCT Filed: Jul. 12, 2023

(86) PCT No.: PCT/CN2023/106919
§ 371 (c)(1),
(2) Date: Jan. 10, 2025

(87) PCT Pub. No.: WO2024/017106
PCT Pub. Date: Jan. 25, 2024

(65) Prior Publication Data
US 2025/0175629 A1     May 29, 2025

(30) Foreign Application Priority Data
Jul. 19, 2022    (CN) .......................... 202210855856.1

(51) Int. Cl.
*H04N 19/40* (2014.01)
*H04N 19/146* (2014.01)
(52) U.S. Cl.
CPC ........... *H04N 19/40* (2014.11); *H04N 19/146* (2014.11)
(58) Field of Classification Search
CPC .............................. H04N 19/40; H04N 19/146
See application file for complete search history.

(56) References Cited

U.S. PATENT DOCUMENTS

2005/0141773 A1* 6/2005 Mizuno ................ H04N 19/154
375/E7.059
2007/0053426 A1* 3/2007 Lee ........................ H04N 19/13
375/240
(Continued)

FOREIGN PATENT DOCUMENTS

CN       101175210 A     5/2008
CN       109286825 A     1/2019
(Continued)

OTHER PUBLICATIONS

International search report of PCT application No. PCT/CN2023/106919 issued on Oct. 8, 2023.
(Continued)

*Primary Examiner* — Tracy Y. Li
(74) *Attorney, Agent, or Firm* — Dilworth & Barrese, LLP.; Michael J. Musella, Esq.

(57) ABSTRACT

Provided is a method for updating a code table. The method includes: acquiring source stream video data; inputting the source stream video data into a trained preference perception model, wherein the preference perception model analyzes the source stream video data and outputs a video quality distribution table, the video quality distribution table recording prediction preference probabilities corresponding to combinations of different second video code rates and second video resolutions therein, wherein the prediction preference probabilities are predicted values of preference probabilities of a user for inputted video data at combinations of different video code rates and video resolutions; and updating the code table based on the video quality distribution table, wherein the code table records combinations of first video code rates and first video resolutions at different video definition levels.

17 Claims, 4 Drawing Sheets

(56) References Cited

U.S. PATENT DOCUMENTS

| | | | |
|---|---|---|---|
| 2012/0062791 A1 | 3/2012 | Thakolsri et al. | |
| 2012/0314760 A1 | 12/2012 | He | |
| 2015/0036757 A1 | 2/2015 | Schink et al. | |
| 2015/0319468 A1 | 11/2015 | Park et al. | |
| 2016/0366204 A1 | 12/2016 | Zhao et al. | |
| 2018/0014053 A1 | 1/2018 | Venkatraman et al. | |
| 2020/0195934 A1 | 6/2020 | Xing et al. | |
| 2021/0006477 A1 | 1/2021 | Tan et al. | |
| 2021/0159912 A1* | 5/2021 | Wang | H04N 19/129 |
| 2021/0360233 A1 | 11/2021 | Ishtiaq et al. | |
| 2022/0044477 A1* | 2/2022 | Takama | G06T 17/20 |
| 2022/0086466 A1* | 3/2022 | Holland | H04N 19/176 |
| 2022/0124376 A1* | 4/2022 | Said | H04N 19/44 |
| 2023/0188764 A1* | 6/2023 | Pahalawatta | H04N 19/179 |
| | | | 725/116 |

FOREIGN PATENT DOCUMENTS

| | | | | |
|---|---|---|---|---|
| CN | 109660807 A | | 4/2019 | |
| CN | 110719457 A | | 1/2020 | |
| CN | 111107395 A | | 5/2020 | |
| CN | 111327865 A | | 6/2020 | |
| CN | 111669627 A | | 9/2020 | |
| CN | 115379291 A | | 11/2022 | |
| CN | 116584098 A | * 8/2023 | | G06N 3/045 |
| WO | 2020062789 A1 | | 4/2020 | |

OTHER PUBLICATIONS

China National Intellectual Property Administration, First office action of Chinese application No. 202210855856.1 issued on Aug. 10, 2023, which is foreign counterpart application of this US application.

Zhenbo Li et al., Matrix Factorization Recommendation Based on Collaborative Regression Model, Journal of Graphics, vol. 40 No. 6, Dec. 15, 2019, entire document.

China National Intellectual Property Administration, Notification to grant patent right for invention of Chinese application No. 202210855856.1 issued on Nov. 22, 2023, which is foreign counterpart application of this US application.

Kaiming He et al., Deep Residual Learning for Image Recognition, Proceedings of the IEEE conference on computer vision and pattern recognition. 2016. Dec. 10, 2015, entire document.

Netflix Technology Blog, Per-Title Encode Optimization, Dec. 14, 2015, https://netflixtechblog.com/per-title-encode-optimization-7e99442b62a2.

* cited by examiner

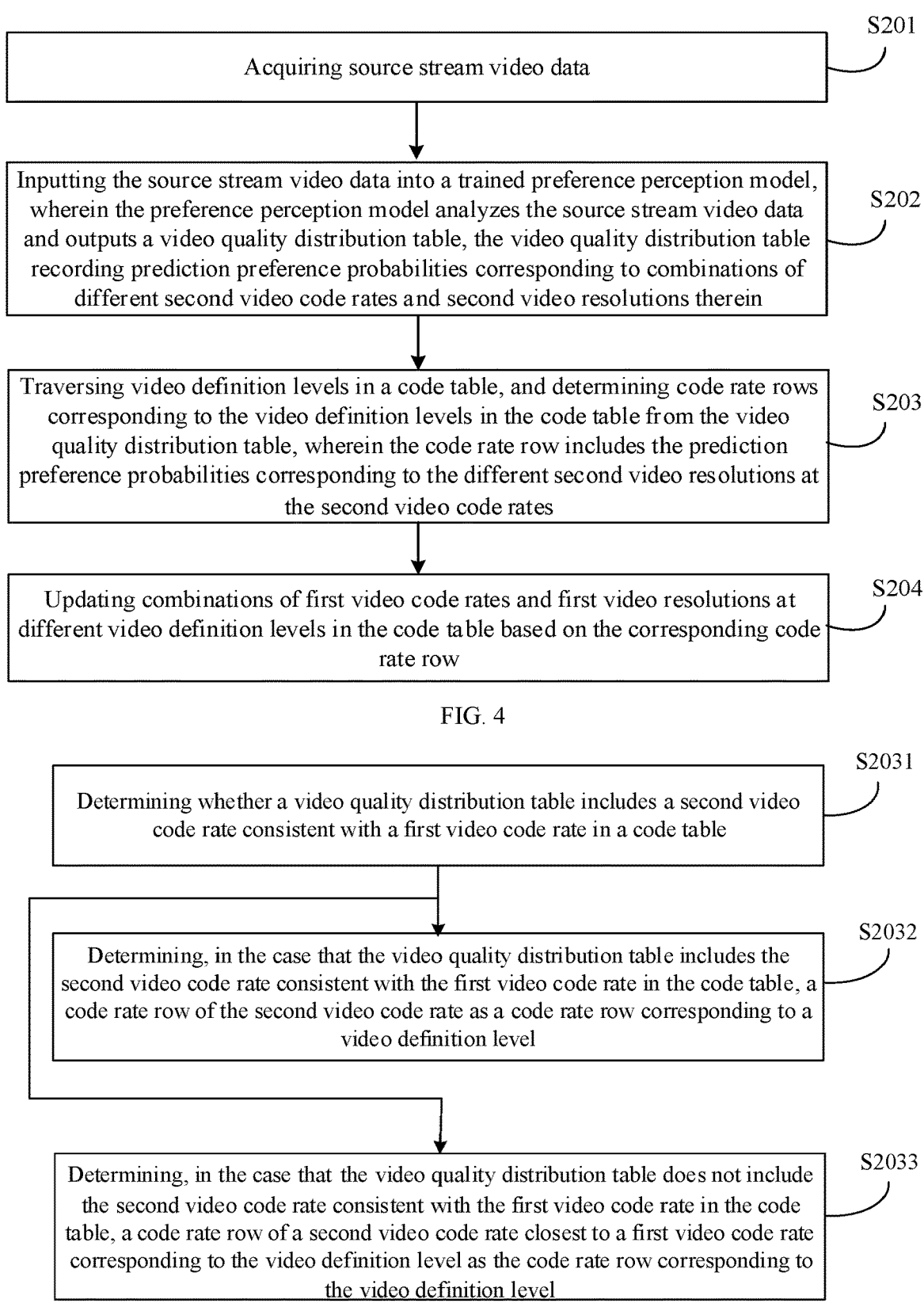

S201

Acquiring source stream video data

S202

Inputting the source stream video data into a trained preference perception model, wherein the preference perception model analyzes the source stream video data and outputs a video quality distribution table, the video quality distribution table recording prediction preference probabilities corresponding to combinations of different second video code rates and second video resolutions therein

S203

Traversing video definition levels in a code table, and determining code rate rows corresponding to the video definition levels in the code table from the video quality distribution table, wherein the code rate row includes the prediction preference probabilities corresponding to the different second video resolutions at the second video code rates

S204

Updating combinations of first video code rates and first video resolutions at different video definition levels in the code table based on the corresponding code rate row

Determining whether a video quality distribution table includes a second video code rate consistent with a first video code rate in a code table

S2032

Determining, in the case that the video quality distribution table includes the second video code rate consistent with the first video code rate in the code table, a code rate row of the second video code rate as a code rate row corresponding to a video definition level

S2033

Determining, in the case that the video quality distribution table does not include the second video code rate consistent with the first video code rate in the code table, a code rate row of a second video code rate closest to a first video code rate corresponding to the video definition level as the code rate row corresponding to the video definition level

FIG. 5

METHOD FOR UPDATING CODE TABLE, DEVICE, STORAGE MEDIUM

CROSS-REFERENCE TO RELATED APPLICATION

The present disclosure is a U.S. national stage of international application No. PCT/CN2023/106919, filed on Jul. 12, 2023, which claims priority to Chinese Patent Application No. 202210855856.1, filed on Jul. 19, 2022, the disclosures of which is are herein incorporated by references in their entireties.

TECHNICAL FIELD

Embodiments of the present disclosure relate to the technical field of video processing, in particular, relate to a method, apparatus, and device for updating a code table, and a storage medium.

BACKGROUND

With the rapid development of information technologies, video applications, for example, live streaming, video on demand, and short videos have a profound influence on popular lives. Since different video sources may adopt different encoding standards, a video service provider has a large amount of user groups, and different users have different terminal (for example, mobile phones or set-top boxes) processing capabilities and different network bandwidth conditions, the video service provider often transcodes the video source to meet requirements of different user groups.

SUMMARY

Embodiments of the present disclosure provide a method and device for updating a code table, and a storage medium.

Some embodiments of the present disclosure provide a method for updating a code table. The method includes:

acquiring source stream video data;

inputting the source stream video data into a trained preference perception model, wherein the preference perception model analyzes the source stream video data and outputs a video quality distribution table, the video quality distribution table recording prediction preference probabilities corresponding to combinations of different second video code rates and second video resolutions therein, wherein the prediction preference probabilities are predicted values of preference probabilities of a user for inputted video data at combinations of different video code rates and video resolutions; and updating the code table based on the video quality distribution table, wherein the code table records combinations of first video code rates and first video resolutions at different video definition levels.

Some embodiments of the present disclosure provide a device for updating a code table. The device includes: a memory and one or more processors.

The memory is configured to store one or more programs.

The one or more processors, when loading and running the one or more programs, are caused to perform the method for updating the code table as defined in the above embodiments.

Some embodiments of the present disclosure provide a non-transitory storage medium storing one or more computer-executable instructions. The one or more computer-executable instructions, when loaded and executed by a processor of a computer, cause the processor of the computer to perform the method for updating the code table as defined in above embodiments.

BRIEF DESCRIPTION OF THE DRAWINGS

FIG. 4 is a flowchart of another method for updating a code table according to some embodiments of the present disclosure;

FIG. 5 is a schematic diagram of a process of determining a code rate row according to some embodiments of the present disclosure;

DETAILED DESCRIPTION

For clearer descriptions of the objectives, technical solutions, and advantages of the present disclosure, specific embodiments of the present disclosure are further described in detail hereinafter in conjunction with the accompanying drawings. It should be understood that the specific embodiments described herein are merely used to explain the present disclosure and are not intend to limit the present disclosure. In addition, it shall be noted that for convenience of description, only the portions associated with the present disclosure, rather than the entire content, are shown in the accompanying drawings. Before detailed description of exemplary embodiments, it should be noted that some exemplary embodiments are described as processes or methods depicted as flowcharts. Although the flowchart describes operations (or steps) in sequence, many of the operations may be performed in parallel, concurrently, or simultaneously. In addition, the sequence of the operations may be rearranged. The process may be terminated when t operations are completed, but may include additional steps that are not included in the accompanying drawings. The process may correspond to a method, a function, a procedure, a subroutine, a subprogram, and the like.

The video transcoding refers to a process of recompressing compressed and encoded video streams based on another (or more) encoding format, and the transcoding may change parameters, for example, a video resolution, a code rate, a frame rate, and a frame structure, such that a video may meet the requirements of different user groups. At present, the traditional video transcoding usually adopts a "one-to-more" method. That is, a source video is transcoded into a series of videos with different code rates and resolutions based on a set of fixed code tables, and then the video at a corresponding definition level is distributed based on conditions of the terminal device and network of the user. The fixed code table ensures that most video contents have great quality in the case of a limited code rate. However, the flexibility of the scheme of the fixed code table is low, the code rate and the resolution is prone to incompatibility, such that the user experience for playing back the video is affected.

Figure 1:
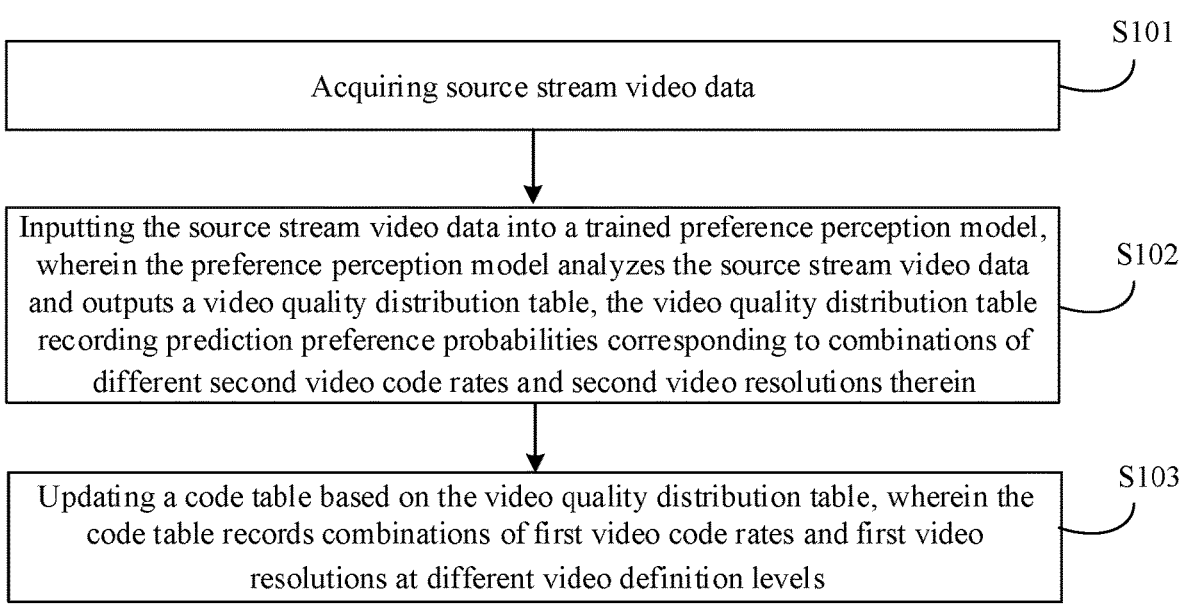
FIG. 1 is a flowchart of a method for updating a code table according to some embodiments of the present disclosure.

FIG. 1 shows a flowchart of a method for updating a code table according to some embodiments of the present disclosure. The method for updating the code table according to the embodiments of the present disclosure is applicable to an apparatus for updating a code table, and the apparatus for updating the code table may be practiced in a hardware and/or software manner and integrated into a device for updating a code table (for example, an encoding server).

The following description is given using an example where the apparatus for updating the code table performs the method for updating the code table. Referring to FIG. 1, the method for updating the code table includes the following processes.

In S101, source stream video data is acquired.

The source stream video data is video data before transcoding, and transcoded video data at a plurality of video definition levels (different video definition levels correspond to combinations of different video code rates and video resolutions) is acquired after video transcoding is performed on the source stream video data based on a code table. The original code table may be issued by a codec server (CS) based on a region of a user.

The video transcoding may be the process of recompressing the compressed and encoded video stream based on another (or more) encoding format, for example, transcoding a code stream from an H.264 format to an HEVC format. The video transcoding further changes parameters, for example, the video code rate and the video resolution, such that the video meets different video playing back requirements. For example, the video resolution of the source stream video is reduced, and a high-definition video is transcoded into a low-definition video to adapt to the decoding capability of a low-end mobile phone; or, the code rate of the source stream video is reduced, and the volume of the video stream is reduced to adapt to a transmission scenario with the limited network bandwidth.

In some practices, the video transcoding of the source stream video data is performed based on a fixed code table. That is, the source stream video data is transcoded into transcoded video data at a plurality of fixed video definition levels based on fixed combinations of code rates and resolutions in the code table, and then the video definition levels distributed to users are determined based on the conditions of the terminal device and network of the users. The fixed code table is generally formulated by developers based on experience, and ensures that most video contents have great video quality in the case of a limited code rate. However, the fixed code table is greatly limited by application scenarios, such that video data transcoded based on the fixed code table cannot meet the video watching requirements of different users. For example, for a high-definition video with severe grain noise, an encoding block effect still exists in the video acquired by transcoding using a higher code rate (for example, 5800 k), and thus a great watching experience cannot be achieved. For a simple video (for example, a cartoon animation), a video with high quality (for example, a1080P video) is encoded without a high code rate, while the high code rate may cause large code rate waste. In some practices, in per-title encoding scheme, a series of rate-distortion curves (RD curves) at a given resolution are acquired by an exhaustive method, and an optimal code table is acquired by envelopes of a plurality of rate-distortion curves. However, for a service with a high real-time requirement (for example, live-streaming transcoding), since the service with the high real-time requirement has a high requirement on timeliness, the code table is not acquired by the exhaustive method, such that operability is poor. Moreover, in the encoding scheme, a peak signal-to-noise ratio (PSNR) is determined as an indicator for measuring the video quality, while the PSNR cannot accurately reflect subjective quality experience of the user, such that the user experience for watching the video is difficult to ensure.

In order to solve the above technical problems, the embodiments of the present disclosure provide a preference perception model related to video content and dynamically update the code table, such that the modes of fixed video code rates and video resolutions in the scheme of the fixed code table are reduced, which is more suitable to the video content and user experience and ensures the user experience of watching the video. Meanwhile, the optimal video resolutions at different video code rates are predicted using the deep learning preference perception model, such that the code table is updated in real time without multiple times of encoding by the exhaustive method, and the operability is higher. In addition, the preference of the video resolution at different video code rates for the corresponding video content is predicted based on the subjective video quality experience of the user, such that the code table is updated to be more suitable to the actual user experience for watching the video.

Exemplarily, the CS provides an initial code table to a video server (VS), and the apparatus for updating the code table in a transcoding server acquires the code table from the VS and performs video transcoding on source stream video data provided by a terminal device (for example, an anchor end in a video live-streaming scenario) in real time based on the code table to acquire transcoded video data at a plurality of video definition levels (for example, ultra-definition, high-definition, and full-high-definition). The apparatus for updating the code table acquires the source stream video data (the source stream video data meeting the resolution requirement, for example, the source stream video data reaching 720p) based on a set period, and provides the acquired source stream video data to the preference perception model for analysis to determine the optimal video resolution at each video definition level. In some embodiments, the source stream video data is acquired based on a set period to update the code table, such that the code table is dynamically updated in time when a user switches scenarios (for example, switching scenarios during video live streaming) in a scenario with a high real-time requirement, and the watching experience of the user is ensured.

In S102, the source stream video data is inputted into a trained preference perception model, wherein the preference perception model analyzes the source stream video data and outputs a video quality distribution table, the video quality distribution table recording prediction preference probabilities corresponding to combinations of different second video code rates and second video resolutions therein.

The preference perception model in the embodiments is configured to analyze the inputted video data and output a corresponding video quality distribution table, and the video quality distribution table records the prediction preference probabilities corresponding to the combinations of different second video code rates and second video resolutions therein. The prediction preference probabilities may be predicted values of the preference probabilities of the user for the inputted video data at the combinations of different video code rates and video resolutions.

The preference perception model extracts video features by a convolutional neural network, trains the preference perception model based on collected sample data (for example, preference probabilities of different users for transcoded videos at combinations of different video code rates and video resolutions in different video contents), and configures the trained preference perception model in the apparatus for updating the code table.

Exemplarily, after the source stream video data is acquired based on the set period, the source stream video data is inputted into the trained preference perception model. Upon receiving the source stream video data, the preference perception model analyzes the source stream video data and outputs a video quality distribution table. The video quality distribution table reflects predicted values of preference probabilities of the user for combinations of different second video code rates and second video resolutions in the source stream video data of the current content type.

In some embodiments, the preference perception model in the embodiments is acquired by training based on perception data sets corresponding to sample video data of different content types. That is, the sample video data in the perception data sets are used as an input and corresponding video quality distribution (sample preference probability distribution) is used as an output to train the preference perception model. The perception data set is constructed based on distribution of preference degrees of human eyes for videos of different content types in the resolution dimension, and records sample preference probabilities of the corresponding sample video data at combinations of different third video code rates and third video resolutions. The content type of the sample video data is indoor live streaming, outdoor live streaming, game live streaming, screen-recording text, animation, meaningless video (for example, video of stationary scenario, of monotonous hue, or lacking details), and the like.

Exemplarily, a series of video code rate gradients B and video resolution gradients R are defined, that is, B= $\{B_0, B_1, \ldots, B_M\}$ and R=$\{R_0, R_1, \ldots, R_N\}$. A video source set V (for example, live-streaming content video sources) of a plurality of content types is acquired, video transcoding is performed on each video source in the video source set V based on encoding parameters of a video code rate $B_i \in B$ and a video resolution $R_j \in R$, and all possible parameter groups $\{B_i, R_j\}$ are traversed to acquire a transcoded video set $V_T$. In addition, a plurality of test users (for example, ordinary video users and non-professionals) evaluate the subjective quality of transcoded videos in the transcoded video set $V_T$ based on the stimulus comparison adjectival categorical judgement (SCACJ) method, and select one (or more) transcoded video with the best quality from each parameter group $\{B_i, R_{0 \sim N}\}$ and record the corresponding video resolution. Exemplarily, in the case of a third video code rate gradient B=$\{200$ kbps, 300 kbps, . . . , 1800 kbps$\}$ and a third video resolution gradient R=$\{360p, 480p, 540p, 720p\}$, the sample preference probability distribution is as shown in the following table:

| Content type | Resolution | code rate | | | | | |
| | | 200k | 300k | 500k | 800k | 1.2M | 1.8M |
|---|---|---|---|---|---|---|---|
| Indoor live | 360p | 0.67 | 0.33 | 0 | 0 | 0 | 0 |
| streaming | 480p | 0.17 | 0.17 | 0.17 | 0 | 0 | 0 |
| | 540p | 0.17 | 0.17 | 0.17 | 0 | 0.17 | 0.17 |
| | 720p | 0 | 0.33 | 0.67 | 1 | 0.83 | 0.83 |
| Meaningless | 360p | 0.22 | 0.24 | 0.25 | 0.22 | 0.25 | 0.24 |
| live streaming | 480p | 0.28 | 0.24 | 0.25 | 0.26 | 0.25 | 0.24 |
| | 540p | 0.22 | 0.24 | 0.25 | 0.26 | 0.25 | 0.29 |
| | 720p | 0.28 | 0.29 | 0.25 | 0.26 | 0.25 | 0.24 |

-continued

| Content type | Resolution | code rate | | | | | |
| | | 200k | 300k | 500k | 800k | 1.2M | 1.8M |
|---|---|---|---|---|---|---|---|
| Screen- | 360p | 0 | 0 | 0 | 0 | 0 | 0 |
| recording text | 480p | 0 | 0 | 0 | 0 | 0 | 0 |
| | 540p | 0 | 0 | 0 | 0 | 0 | 0 |
| | 720p | 1 | 1 | 1 | 1 | 1 | 1 |

Finally, the evaluation results of all test users are summarized, and the preference frequency $B_i$ of each video resolution selected at a specific video code rate $B_i$, that is, distrib$_{B_i}$=$D_{B_i}$=$\{p_0, p_1, \ldots, p_N\}$ is calculated to determine the subjective quality perception distribution of the test users for the group of video sources. The higher the preference frequency (closer to 1), the more the test users tending to the transcoded video with the video resolution. Therefore, for any video source $V_k \in V$, the label of the video quality distribution (sample preference probability distribution) in the perception data set is finally $\{V_k, D_{B_0}, \ldots, D_{B_N}\}$. It should be understood that for transcoded videos of different content types, the subjective experience of the user for different resolutions at different code rates are different. For example, for indoor live streaming, as the video code rate changes from low to high, the preferred video definition level of the user also changes from a low definition level to a high definition level. For meaningless live streaming, the preference of the user on the video definition level at various video code rates is not obvious. For screen recording live streaming with a large number of texts, the user prefers to the video definition level with high definition.

Figure 2:
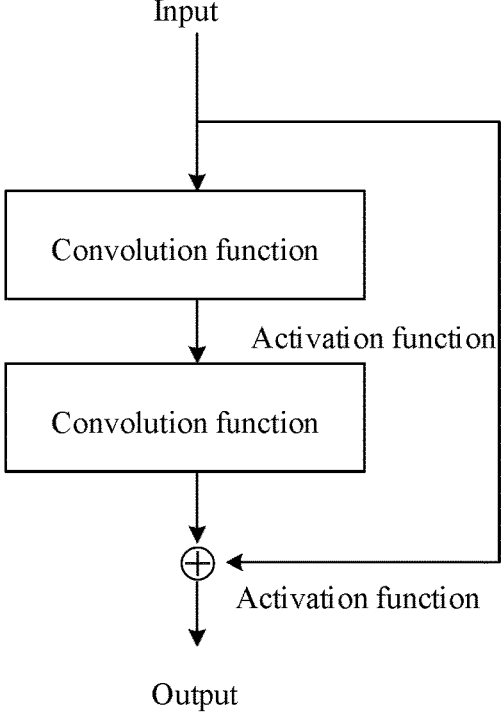
FIG. 2 is a schematic diagram of a residual structure according to some embodiments of the present disclosure.
Figure 3:
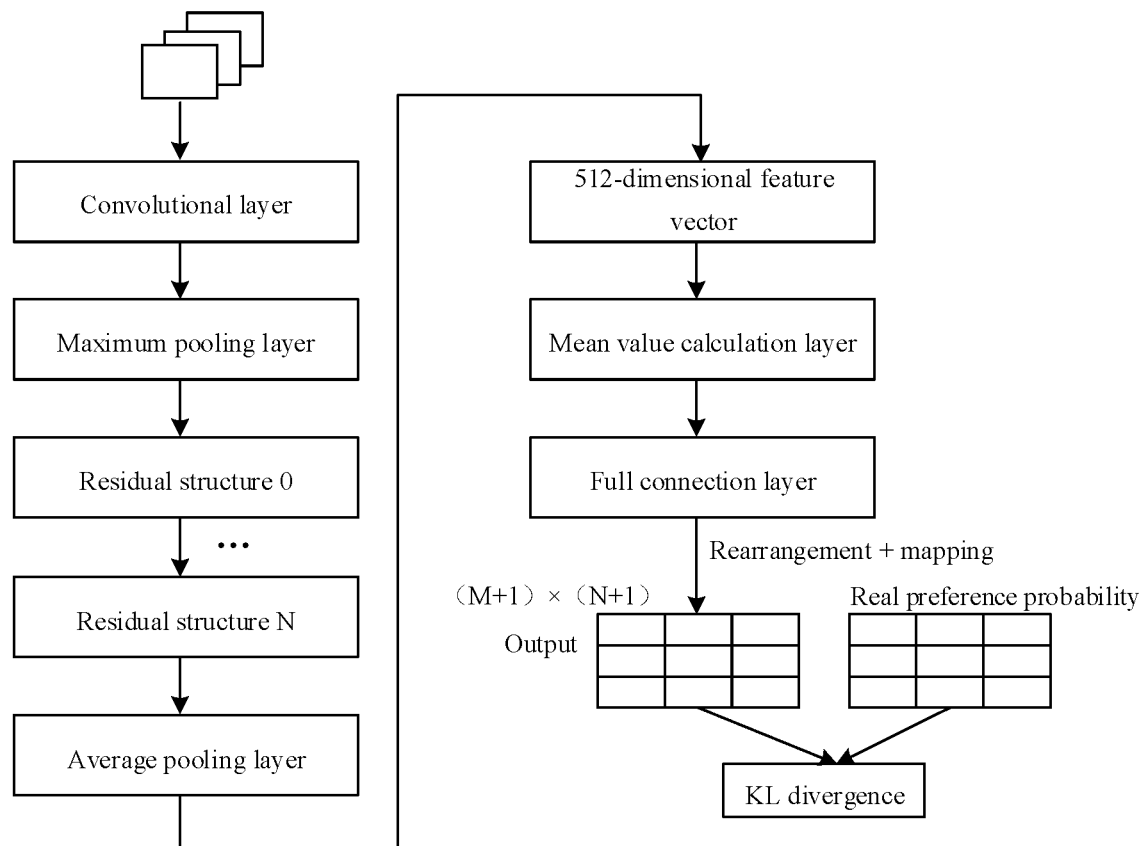
FIG. 3 is a schematic diagram of a network structure of a preference perception model according to some embodiments of the present disclosure.

In some embodiments, the preference perception model in the embodiments is built based on a residual structure, deeper features of video data are extracted through the residual structure, and the prediction of the preference probability at combinations of different third video code rates and third video resolutions is more accurate. In addition, the full connection layer (FC layer) of the preference perception model in the embodiments maps the video feature vectors of the sample video data based on a set size, and the set size is determined based on a distribution table size corresponding to the sample video data at combinations of different third video code rates and third video resolutions. As shown in the schematic diagram of the residual structure according to FIG. 2, the residual structure sums the input and the output in a "short-circuit connection" method based on a stack structure of a plurality of convolutional layers, such that the residual features of the video data are learned online by the preference perception model during training, and for the preference perception model, the video feature learning is easier than directly learning the original features of the video data, thereby improving the training efficiency of the preference perception model. As shown in the schematic diagram of the network structure the preference perception model in FIG. 3, for a series of inputted sample video data, the preference perception model first mines shallow features of each sample video frame (a sample video frame for feature extraction may be extracted from the sample video data based on a set time interval) of the sample video data through a convolutional layer (including a convolution function conv, a batch normalization function bn, and an activation function relu), and performs a pooling operation through a maximum pooling layer (max pool). Then, the deeper features of the sample video frame are extracted through a plurality of stacked residual structures (residual structures 0 to N), and the pooling operation is performed through an average pooling layer (avg pool) to acquire a 512-dimensional feature vector. In this case, the semantic features of the video in a two-dimensional space are extracted by the convolutional neural network of the preference perception model, the feature vectors performs mean value calculation in the frame dimension in a mean value calculation layer (mean by frame) to further mine the features of the video time domain, and the calculated mean value is determined as the feature vector of the entire video segment corresponding to the sample video data. Finally, the feature vector is mapped into a vector with a length of (M+1)× (N+1) through the FC layer and just corresponds to the combination of (M+1) third video code rates and (N+1) third video resolutions, and the predicted video quality distribution table is acquired by rearranging and mapping (softmax operation) the feature vector.

In some embodiments, in the case that the preference perception model is trained, the preference perception model utilizes a KL divergence loss function as a model loss function, and is optimized based on a random gradient descent algorithm. Compared with a general classification network which determines cross entropy as a loss function, in the embodiments, KL divergence is adopted to measure a difference between predicted distribution and real distribution, and the prediction by the preference perception model on the video quality distribution table is closer to the real value. For example, assuming that the video quality distribution predicted by the network of the preference perception model at the third video code rate $B_i$ is $Q_{B_i}=\{q_0, q_1, \ldots, q_N\}$, and the real video quality distribution is $P_{B_i}=\{p_0, p_1, \ldots, p_N\}$, then the KL divergence is:

$$L_{B_i} = KL(P \mid Q) = \sum_{j=0}^{N} \left[ p_j * \log\left(\frac{p_j}{q_j}\right) \right].$$

Correspondingly, a total loss of the preference perception model is:

$$L = \sum_{i=0}^{M} L_{B_i}.$$

$q_i$ represents a prediction preference probability corresponding to an i-th third video resolution corresponding to the third video code rate $B_i$, and $p_i$ represents a real preference probability corresponding to an i-th video resolution corresponding to the real video code rate. In the case that the total loss of the preference perception model is within a set loss threshold, the preference perception model is trained completely, and the preference perception model is configured into the apparatus for updating the code table.

In S103, the code table is updated based on the video quality distribution table, wherein the code table records combinations of first video code rates and first video resolutions at different video definition levels.

Exemplarily, upon determination of the video quality distribution table corresponding to the source stream video data, the code table is updated based on the video quality distribution table, such that the combinations of the first video code rates and the first video resolutions at different video definition levels recorded in the code table are updated.

In some embodiments, upon update of the code table, in the case that the combinations of the first video code rates and the first video resolutions in the code table change relative to the combinations of the first video code rates and the first video resolutions in the previous code table, the encoder in the transcoding server is restarted, and the video transcoding is performed based on the updated code table. That is, the preference perception model predicts the optimal video resolution of the video code rate corresponding to each video definition level. In the case that the video resolution is different from the first video resolution in the original code table, the first video resolution corresponding to the first video code rate in the original code table is replaced by the video resolution, the encoder is restarted, and transcoding is performed based on the new first video resolution; otherwise, the original code table is still adopted, the process returns to wait for the next acquisition of the source stream video data, the preference perception model outputs the video quality distribution table, and whether the code table needs to be updated is determined again.

According to the above description, the source stream video data is inputted into the preference perception model, the preference perception model analyzes the source stream video data to acquire the video quality distribution table, and the combinations of the first video code rates and the first video resolutions at different video definition levels recorded in the code table are updated based on the prediction preference probabilities corresponding to the combinations of different second video code rates and second video resolutions recorded in the video quality distribution table. In this case, the acquired combinations of code rates and resolutions are more suitable to the code table of the current source stream video data, the flexibility of determining the code table is improved, and the user experience for playing back the video is effectively ensured. Meanwhile, the preference perception model is trained based on the perception data sets corresponding to the sample video data of different content types to acquire a content-adaptive preference perception model, such that the corresponding video quality distribution table is flexibly output for different video contents, the subjective experience of the user on videos of different content types is accurately predicted, and the update of the code table is more suitable for the actual user experience.

Based on the above embodiments, FIG. 4 shows a flow-chart of another method for updating a code table according to the embodiments of the present disclosure, and the method for updating the code table is the specification of the method for updating the code table described above. Referring to FIG. 4, the method for updating the code table includes the following processes.

In S201, source stream video data is acquired.

In S202, the source stream video data is inputted into a trained preference perception model, wherein the preference perception model analyzes the source stream video data and outputs a video quality distribution table, the video quality distribution table recording prediction preference probabilities corresponding to combinations of different second video code rates and second video resolutions therein.

In S203, video definition levels in the code table are traversed, and code rate rows corresponding to the video definition levels in the code table are determined from the video quality distribution table, wherein the code rate rows include the prediction preference probabilities corresponding to the different second video resolutions at the second video code rates.

The code table in the embodiments records combinations of the first video code rates and the first video resolutions at different video definition levels. Exemplarily, upon acquisition of the video quality distribution table outputted by the preference perception model, the video definition levels in the current code table are traversed, and a code rate row corresponding to the first code rate at the video definition levels in the current code table is determined in the above video quality distribution table.

The code rate row is recorded in the video quality distribution table and corresponds to the corresponding prediction preference probabilities at the different second video resolutions at the second video code rates, and the sum of the corresponding prediction preference probabilities at all the second video resolutions at the same code rate row is a set value (for example, 1 or 100%).

In some embodiments, the determination of the code rate row corresponding to each video definition level in the code table is to determine a second video code rate consistent with the first video code rate in the code table, or a second video code rate closest to the first video code rate. On this basis, as shown in the schematic diagram of the process of determining the code rate row according to FIG. 5, in the case that the code rate rows corresponding to the video definition levels in the code table are determined from the video quality distribution table in the embodiments, the method includes the following processes.

In S2031, whether the video quality distribution table includes a second video code rate consistent with the first video code rate in the code table is determined.

In S2032, in the case that the video quality distribution table includes the second video code rate consistent with the first video code rate in the code table, the code rate row of the second video code rate is determined as the code rate row corresponding to the video definition level.

In S2033, in the case that the video quality distribution table does not include the second video code rate consistent with the first video code rate in the code table, the code rate row of a second video code rate closest to a first video code rate corresponding to the video definition level is determined as the code rate row corresponding to the video definition level.

Exemplarily, upon acquisition of the video quality distribution table outputted by the preference perception model, the first video code rates corresponding to the video definition levels in the current code table are traversed, and whether the video quality distribution table includes a second video code rate consistent with each video code rate is determined.

For a video definition level, in the case that the video quality distribution table includes a second video code rate consistent with the first video code rate, the code rate row corresponding to the second video code rate is directly determined as the code rate row corresponding to the video definition level. In the case that the video quality distribution table does not include the second video code rate consistent with the first video code rate, the code rate row of the second video code rate closest to the first video code rate corresponding to the video definition level is determined as the code rate row corresponding to the video definition level. That is, the set $\{B_{old}, R_{old}\}$ of the first video code rates and the first video resolutions at the video definition levels in the current code table are traversed, the corresponding code rate row $Q=\{Q_{B_2}, \ldots, Q_{B_N}\}$ in the video quality distribution table is selected, in the case that $B_{old} \in B$, $Q=Q_{B_{old}}$; and in the case that $B_{old} \notin B$, a code rate row closest to $B_{old}$ is selected from B, that is, $$idx = \underset{j}{\operatorname{argmin}}|B_{old} - B_j| \text{ and } Q = Q_{B_{idx}}.$$

In S204, the combinations of the first video code rates and the first video resolutions at different video definition levels in the code table are updated based on the corresponding code rate rows.

Exemplarily, upon determination of the code rate rows corresponding to different video definition levels in the code table, the combinations of the first video code rates and the first video resolutions at different video definition levels in the code table are updated based on the prediction preference probabilities corresponding to the second video resolutions in the code rate rows. For example, the second video resolution corresponding to the maximum prediction preference probability in the code rate row is replaced by the corresponding first video resolution in the code table, such that the combination of the first video code rate and the first video resolution at the corresponding video definition level in the code table is more suitable for the user experience for watching the video.

In some embodiments, the first video resolution is updated based on the prediction preference probability dominant in the code rate row to acquire the first video resolution that is more consistent with the subjective experience of the user. On this basis, in the embodiments, in the case that the combinations of the first video code rates and the first video resolutions at different video definition levels in the code table are updated based on the corresponding code rate rows, the method includes: determining, for different video definition levels in the code table, whether the corresponding code rate row includes a second video resolution meeting the encoding parameter update condition; and updating, in a case that the corresponding code rate row includes the second video resolution meeting the encoding parameter update condition, the first video resolution at the corresponding video definition level in the code table based on the second video resolution.

Exemplarily, for the video definition levels in the current code table, whether the corresponding code rate row includes the second video resolution meeting the encoding parameter update condition is determined. Whether the code rate row includes the second video resolution meeting the encoding parameter update condition is determined based on the maximum prediction preference probability in the code rate row. That is, the maximum prediction preference probability is determined from the prediction preference probabilities of the second video resolutions in the code rate row, and whether the maximum prediction preference probability reaches a set probability threshold is determined. In the case that the maximum prediction preference probability reaches the set probability threshold, the code rate row includes the second video resolution meeting the encoding parameter update condition. In the embodiments, the conservative degree of the code table update algorithm is controlled by setting the probability threshold, such that the method more flexibly adapts to various application scenarios and is more flexible.

In the case that the code rate row includes the second video resolution meeting the encoding parameter update condition, the first video resolution at the corresponding video definition level in the code table is updated based on the second video resolution corresponding to the maximum prediction preference probability in the code rate row. In the case that the first video resolution at the corresponding video definition level in the code table is updated based on the second video resolution corresponding to the maximum prediction preference probability in the code rate row, whether the second video resolution corresponding to the maximum prediction preference probability is consistent with the first video resolution at the corresponding video definition level is first determined, the first video resolution does not need to be modified in the case that the second video resolution corresponding to the maximum prediction preference probability is consistent with the first video resolution at the corresponding video definition level, and the first video resolution at the corresponding video definition level is modified into the second video resolution corresponding to the maximum prediction preference probability in the case that the second video resolution corresponding to the maximum prediction preference probability is not consistent with the first video resolution at the corresponding video definition level. In the case that the code rate row does not include the second video resolution meeting the encoding parameter update condition, the first video code rate and the first video resolution at the video definition level do not need to be modified. Upon update of all video definition levels of the code table, the encoder is restarted in the case that the code table includes the modified first video resolution rate, and transcoding is performed on the source stream video data based on the updated code table. In the case that the first video resolution rates in the code table are not modified, the current encoder and the code table are kept to wait for the next acquisition of the source stream video data to analyze whether to update the code table.

According to the above description, the source stream video data is inputted into the preference perception model, the preference perception model analyzes the source stream video data to acquire the video quality distribution table, and the combinations of the first video code rates and the first video resolutions at different video definition levels recorded in the code table are updated based on the prediction preference probabilities corresponding to the combinations of different second video code rates and second video resolutions recorded in the video quality distribution table. In this case, the acquired combinations of code rates and resolutions are more suitable to the code table of the current source stream video data, the flexibility of determining the code table is improved, and the user experience for playing back the video is effectively ensured. Meanwhile, the code rate row corresponding to each first video code rate in the code table is flexibly determined, the first video resolution is dynamically updated based on the code rate row corresponding to each first video code rate in the code table, and the combination of the first video code rate and the first video resolution at each video definition level is more finely and dynamically determined, such that the flexibility of video transcoding and the subjective quality of the video are improved. In addition, the second video resolution meeting the encoding parameter update condition is determined based on the comparison of the maximum prediction preference probability and the set probability threshold, such that the optimal encoding resolution is determined, the resolution parameters in the live-streaming transcoded code table are optimized, the subjective quality of the online video is improved one the premise of the unchanged bandwidth, and a great video user experience of watching the video is achieved.

Figure 6:
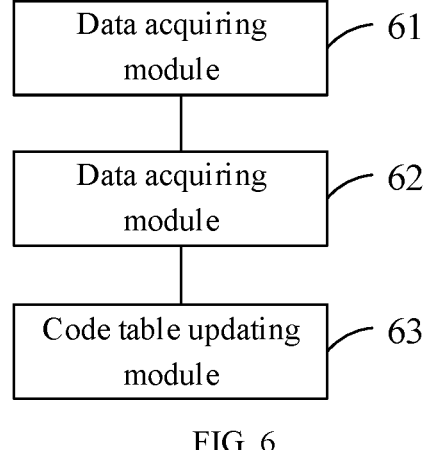
FIG. 6 is a schematic structural diagram of an apparatus for updating a code table according to some embodiments of the present disclosure.

FIG. 6 is a schematic structural diagram of an apparatus for updating a code table according to some embodiments of the present disclosure. Referring to FIG. 6, the apparatus for updating the code table includes a data acquiring module 61, a data analyzing module 62, and a code table updating module 63.

The data acquiring module 61 is configured to acquire source stream video data; the data analyzing module 62 is configured to input the source stream video data into a trained preference perception model, wherein the preference perception model analyzes the source stream video data and outputs a video quality distribution table, the video quality distribution table recording prediction preference probabilities corresponding to combinations of different second video code rates and second video resolutions therein; the code table updating module 63 is configured to update the code table based on the video quality distribution table, wherein the code table records combinations of first video code rates and first video resolutions at different video definition levels.

According to the above description, the source stream video data is inputted into the preference perception model, the preference perception model analyzes the source stream video data to acquire the video quality distribution table, and the combinations of the first video code rates and the first video resolutions at different video definition levels recorded in the code table are updated based on the prediction preference probabilities corresponding to the combinations of different second video code rates and second video resolutions recorded in the video quality distribution table. In this case, the acquired combinations of code rates and resolutions are more suitable to the code table of the current source stream video data, the flexibility of determining the code table is improved, and the user experience for playing back the video is effectively ensured.

In some embodiments, the code table updating module 63 is specifically configured to:
    traverse video definition levels in the code table, and determine code rate rows corresponding to the video definition levels in the code table from the video quality distribution table, wherein the code rate rows include the corresponding prediction preference probabilities corresponding to the different second video resolutions at the second video code rates; and
    update the combinations of the first video code rates and the first video resolutions at different video definition levels in the code table based on the corresponding code rate rows.

In some embodiments, in the case of determining the code rate rows corresponding to the video definition levels in the code table from the video quality distribution table, the code table updating module 63 is configured to:
    determine, in the case that the video quality distribution table include a second video code rate consistent with the first video code rate in the code table, the code rate row of the second video code rate as the code rate row corresponding to the video definition level; or
    determine, in the case that the video quality distribution table does not include the second video code rate consistent with the first video code rate in the code table, the code rate row of a second video code rate closest to a first video code rate corresponding to the video definition level as the code rate row corresponding to the video definition level.

In some embodiments, in the case of updating the combinations of the first video code rates and the first video resolutions at different video definition levels in the code table based on the corresponding code rate row, the code table updating module 63 is configured to:
    determine, for the different video definition levels in the code table, whether the corresponding code rate row includes a second video resolution meeting an encoding parameter update condition; and
    update, in a case that the corresponding code rate row includes the second video resolution meeting the encoding parameter update condition, the first video resolution at the corresponding video definition level in the code table based on the second video resolution.

In some embodiments, in the case that the maximum prediction preference probability in the code rate row reaches a set probability threshold, the code rate row includes the second video resolution meeting the encoding parameter update condition.

In some embodiments, the preference perception model is acquired by training based on perception data sets corresponding to sample video data of different content types, and the perception data sets record sample preference probabilities corresponding to the corresponding sample video data at combinations of different third video code rates and third video resolutions.

In some embodiments, the preference perception model is built based on a residual structure, utilizes a KL divergence loss function as a model loss function, and is optimized based on a random gradient descent algorithm, and an FC layer of the preference perception model maps the video feature vectors of the sample video data based on a set size, wherein the set size is determined based on a distribution table size corresponding to the sample video data at the combinations of the different third video code rates and third video resolutions.

It is to be noted that in the embodiments of the above apparatus for updating the code table, division of the various units and modules are only performed based on functional logic and is not limited to the above division as long as corresponding functions can be achieved. In addition, the specific names of the functional units are used merely for easy differentiation and do not limit the scope of protection of the embodiments of the present disclosure.

Figure 7:
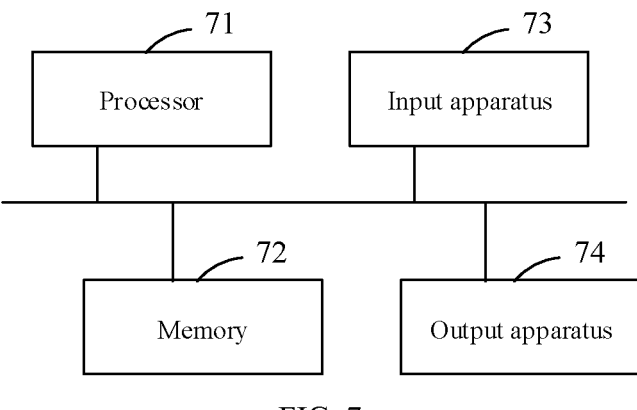
FIG. 7 is a schematic structural diagram of a device for updating a code table according to some embodiments of the present disclosure.

The embodiments of the present disclosure further provide a device for updating a code table. The device for updating the code table can integrate the apparatus for updating the code table in the embodiments of the present disclosure. FIG. 7 is a schematic structural diagram of a device for updating a code table according to some embodiments of the present disclosure. Referring to FIG. 7, the device for updating the code table includes: an input apparatus 73, an output apparatus 74, a memory 72, and one or more processors 71. The memory 72 is configured to store one or more programs; the one or more processors 71, when loading and running the one or more programs, is caused to perform the method for updating the code table as defined in the above embodiments. The apparatus and device for updating the code table and the computer provided above are configured to perform the method for updating the code table in any one of the above embodiments, and have corresponding functions and beneficial effects.

The embodiments of the present disclosure further provide a non-transitory storage medium storing one or more computer-executable instructions. The one or more computer-executable instructions, when loaded and executed by a processor of a computer, cause the processor of the computer to perform the method for updating the code table as defined in the above embodiments. In addition, according to the storage medium storing the one or more computer-executable instructions according to the embodiments of the present disclosure, the one or more computer-executable instructions thereof are not limited to the method for updating the code table provided above, but may be also used to perform related operations in the method for updating the code table in any one of the embodiments of the present disclosure. The apparatus and device for updating the code table and the storage medium according to the above embodiments may perform the method for updating the code table in any one of the embodiments of the present disclosure, and for technical details not described in detail in the above embodiments, reference may be made to the method for updating the code table according to any one of the embodiments of the present disclosure.

The invention claimed is:

1. A method for updating a code table, comprising:
acquiring source stream video data;
inputting the source stream video data into a trained preference perception model, wherein the preference perception model analyzes the source stream video data and outputs a video quality distribution table, the video quality distribution table recording prediction preference probabilities corresponding to combinations of different second video code rates and second video resolutions therein, wherein the prediction preference probabilities are predicted values of preference probabilities of a user for inputted video data at combinations of different video code rates and video resolutions, the preference perception model is trained by using sample video data in perception data sets as an input and using sample preference probability distribution as an output, the preference perception model is acquired by training based on perception data sets corresponding to sample video data of different content types, the perception data set is constructed based on distribution of preference degrees of human eyes for videos of different content types in a resolution dimension, and the perception data sets record sample preference probabilities corresponding to the corresponding sample video data at combinations of different third video code rates and third video resolutions; and
updating the code table based on the video quality distribution table, wherein the code table records combinations of first video code rates and first video resolutions at different video definition levels.

2. The method for updating the code table according to claim 1, wherein updating the code table based on the video quality distribution table comprises:
traversing video definition levels in the code table, and determining code rate rows corresponding to the video definition levels in the code table from the video quality distribution table, wherein the code rate rows comprise the prediction preference probabilities corresponding to the different second video resolutions at the second video code rates; and
updating the combinations of the first video code rates and the first video resolutions at the different video definition levels in the code table based on the corresponding code rate rows.

3. The method for updating the code table according to claim 2, wherein determining the code rate rows corresponding to the video definition levels in the code table from the video quality distribution table comprises:
determining, in a case that the video quality distribution table comprises a second video code rate consistent with the first video code rate in the code table, a code rate row of the second video code rate as a code rate row corresponding to the video definition level; or
determining, in a case that the video quality distribution table does not comprise a second video code rate consistent with the first video code rate in the code table does, a code rate row of a second video code rate closest to a first video code rate corresponding to the video definition level as a code rate row corresponding to the video definition level.

4. The method for updating the code table according to claim 2, wherein updating the combinations of the first video code rates and the first video resolutions at the different video definition levels in the code table based on the corresponding code rate rows comprises:

determining, for the different video definition levels in the code table, whether the corresponding code rate row comprises a second video resolution meeting an encoding parameter update condition; and updating, in a case that the corresponding code rate row comprises the second video resolution meeting the encoding parameter update condition, a first video resolution at a corresponding video definition level in the code table based on the second video resolution.

5. The method for updating the code table according to claim 4, wherein in a case that a maximum prediction preference probability in the code rate row reaches a set probability threshold, the code rate row comprises the second video resolution meeting the encoding parameter update condition.

6. The method for updating the code table according to claim 1, wherein the preference perception model is built based on a residual structure, utilizes a-Kullback-Leibler divergence loss function as a model loss function, and is optimized based on a random gradient descent algorithm, and a full connection layer of the preference perception model maps video feature vectors of the sample video data based on a set size, wherein the set size is determined based on a distribution table size corresponding to the sample video data at the combinations of the different third video code rates and third video resolutions.

7. A device for updating a code table, comprising: a memory and one or more processors, wherein the memory is configured to store one or more programs, and wherein the one or more processors, when loading and running the one or more programs, are caused to:

acquire source stream video data;

input the source stream video data into a trained preference perception model, wherein the preference perception model analyzes the source stream video data and outputs a video quality distribution table, the video quality distribution table recording prediction preference probabilities corresponding to combinations of different second video code rates and second video resolutions therein, wherein the prediction preference probabilities are predicted values of preference probabilities of a user for inputted video data at combinations of different video code rates and video resolutions, the preference perception model is trained by using sample video data in perception data sets as an input and using sample preference probability distribution as an output, the preference perception model is acquired by training based on perception data sets corresponding to sample video data of different content types, the perception data set is constructed based on distribution of preference degrees of human eyes for videos of different content types in a resolution dimension, and the perception data sets record sample preference probabilities corresponding to the corresponding sample video data at combinations of different third video code rates and third video resolutions; and update the code table based on the video quality distribution table, wherein the code table records combinations of first video code rates and first video resolutions at different video definition levels.

8. The device for updating the code table according to claim 7, wherein the one or more processors, when loading and running the one or more programs, are caused to:

traverse video definition levels in the code table, and determine code rate rows corresponding to the video definition levels in the code table from the video quality distribution table, wherein the code rate rows comprise the prediction preference probabilities corresponding to the different second video resolutions at the second video code rates; and update the combinations of the first video code rates and the first video resolutions at the different video definition levels in the code table based on the corresponding code rate rows.

9. The device for updating the code table according to claim 8, wherein the one or more processors, when loading and running the one or more programs, are caused to:

determine, in a case that the video quality distribution table comprises a second video code rate consistent with the first video code rate in the code table, a code rate row of the second video code rate as a code rate row corresponding to the video definition level; or determine, in a case that the video quality distribution table does not comprise a second video code rate consistent with the first video code rate in the code table does, a code rate row of a second video code rate closest to a first video code rate corresponding to the video definition level as a code rate row corresponding to the video definition level.

10. The device for updating the code table according to claim 8, wherein the one or more processors, when loading and running the one or more programs, are caused to:

determine, for the different video definition levels in the code table, whether the corresponding code rate row comprises a second video resolution meeting an encoding parameter update condition; and update, in a case that the corresponding code rate row comprises the second video resolution meeting the encoding parameter update condition, a first video resolution at a corresponding video definition level in the code table based on the second video resolution.

11. The device for updating the code table according to claim 10, wherein in a case that a maximum prediction preference probability in the code rate row reaches a set probability threshold, the code rate row comprises the second video resolution meeting the encoding parameter update condition.

12. The device for updating the code table according to claim 7, wherein the preference perception model is built based on a residual structure, utilizes a-Kullback-Leibler divergence loss function as a model loss function, and is optimized based on a random gradient descent algorithm, and a full connection layer of the preference perception model maps video feature vectors of the sample video data based on a set size, wherein the set size is determined based on a distribution table size corresponding to the sample video data at the combinations of the different third video code rates and third video resolutions.

13. A non-transitory storage medium storing one or more computer-executable instructions, wherein the one or more computer-executable instructions, when loaded and executed by a processor of a computer, cause the processor of the computer to:

acquire source stream video data;

input the source stream video data into a trained preference perception model, wherein the preference perception model analyzes the source stream video data and outputs a video quality distribution table, the video quality distribution table recording prediction preference probabilities corresponding to combinations of different second video code rates and second video resolutions therein, wherein the prediction preference probabilities are predicted values of preference probabilities of a user for inputted video data at combinations of different video code rates and video resolutions, the preference perception model is trained by using sample video data in perception data sets as an input and using sample preference probability distribution as an output, the preference perception model is acquired by training based on perception data sets corresponding to sample video data of different content types, the perception data set is constructed based on distribution of preference degrees of human eyes for videos of different content types in a resolution dimension, and the perception data sets record sample preference probabilities corresponding to the corresponding sample video data at combinations of different third video code rates and third video resolutions; and update the code table based on the video quality distribution table, wherein the code table records combinations of first video code rates and first video resolutions at different video definition levels.

14. The non-transitory storage medium according to claim 13, wherein the one or more computer-executable instructions, when loaded and executed by a processor of a computer, cause the processor of the computer to:

traverse video definition levels in the code table, and determine code rate rows corresponding to the video definition levels in the code table from the video quality distribution table, wherein the code rate rows comprise the prediction preference probabilities corresponding to the different second video resolutions at the second video code rates; and update the combinations of the first video code rates and the first video resolutions at the different video definition levels in the code table based on the corresponding code rate rows.

15. The non-transitory storage medium according to claim 14, wherein the one or more computer-executable instructions, when loaded and executed by a processor of a computer, cause the processor of the computer to:

determine, in a case that the video quality distribution table comprises a second video code rate consistent with the first video code rate in the code table, a code rate row of the second video code rate as a code rate row corresponding to the video definition level; or determine, in a case that the video quality distribution table does not comprise a second video code rate consistent with the first video code rate in the code table does, a code rate row of a second video code rate closest to a first video code rate corresponding to the video definition level as a code rate row corresponding to the video definition level.

16. The non-transitory storage medium according to claim 14, wherein the one or more computer-executable instructions, when loaded and executed by a processor of a computer, cause the processor of the computer to:

determine, for the different video definition levels in the code table, whether the corresponding code rate row comprises a second video resolution meeting an encoding parameter update condition; and update, in a case that the corresponding code rate row comprises the second video resolution meeting the encoding parameter update condition, a first video resolution at a corresponding video definition level in the code table based on the second video resolution.

17. The non-transitory storage medium according to claim 16, wherein in a case that a maximum prediction preference probability in the code rate row reaches a set probability threshold, the code rate row comprises the second video resolution meeting the encoding parameter update condition.

* * * * *